US012179169B2

(12) United States Patent
Kutose et al.

(10) Patent No.: US 12,179,169 B2
(45) Date of Patent: Dec. 31, 2024

(54) ADSORBENT PARTICLES (71) Applicant: NIPPON SODA CO., LTD., Tokyo (JP)

(72) Inventors: Koichi Kutose, Joetsu (JP); Ryo Sato, Joetsu (JP)

(73) Assignee: NIPPON SODA CO., LTD., Tokyo (JP)

( * ) Notice: Subject to any disclaimer, the term of this patent is extended or adjusted under 35 U.S.C. 154(b) by 687 days.

(21) Appl. No.: 17/428,813

(22) PCT Filed: Feb. 10, 2020

(86) PCT No.: PCT/JP2020/005172
§ 371 (c)(1),
(2) Date: Aug. 5, 2021

(87) PCT Pub. No.: WO2020/166570
PCT Pub. Date: Aug. 20, 2020

(65) Prior Publication Data
US 2022/0126264 A1 Apr. 28, 2022

(30) Foreign Application Priority Data
Feb. 14, 2019 (JP) ................................. 2019-024913

(51) Int. Cl.
*B01J 20/02* (2006.01)
*B01J 20/28* (2006.01)
(Continued)

(52) U.S. Cl.
CPC ..... *B01J 20/0229* (2013.01); *B01J 20/28004* (2013.01); *B01J 20/28016* (2013.01);
(Continued)

(58) Field of Classification Search
None
See application file for complete search history.

(56) References Cited

U.S. PATENT DOCUMENTS

| 5,451,253 A | 9/1995 | Klingelhoefer et al. |
| 2002/0077249 A1* | 6/2002 | Schlegel ............... B82Y 30/00 502/328 |

(Continued)

FOREIGN PATENT DOCUMENTS

| CA | 2 423 178 A1 | 3/2003 |
| CN | 1466550 A | 1/2004 |

(Continued)

OTHER PUBLICATIONS

Ishikawa et al ("Influences of metal ions on the formation of β-FeOOH particles", Corrosion Science 43, (2001) 1727-1738). (Year: 2001).*

(Continued)

*Primary Examiner* — Michael Forrest
(74) *Attorney, Agent, or Firm* — Oliff PLC (57) ABSTRACT

An adsorbent consisting of iron oxyhydroxide, having a high adsorption rate and high adsorption efficiency compared with conventional products. The adsorbent particle is an adsorbent particle having a crystal structure of β-iron oxyhydroxide, having an average crystallite diameter of 10 nm or less as measured by X-ray diffraction, wherein 90% or more of volume of adsorbent particle is constituted of granular crystals having crystal particle diameter of 20 nm or less, or columnar crystals having width of 10 nm or less and length of 30 nm or less. The adsorbent particle have at least either of the following characteristics: (A) the adsorbent particle contains metal element other than iron in amount of 0.1 to 20% by mass with respect to iron element, or (B) the adsorbent particle contains sulfur oxoacid ions in an amount of 0.01 to 20% by mass in terms of sulfur element with respect to iron element.

13 Claims, 2 Drawing Sheets

(51) Int. Cl.
  *B01J 20/30*   (2006.01)
  *C01G 49/02*   (2006.01)

(52) U.S. Cl.
  CPC ..... *B01J 20/28061* (2013.01); *B01J 20/3085* (2013.01); *C01G 49/02* (2013.01); *B01J 2220/42* (2013.01); *C01P 2002/60* (2013.01); *C01P 2002/72* (2013.01); *C01P 2002/90* (2013.01); *C01P 2004/04* (2013.01); *C01P 2004/60* (2013.01)

(56) References Cited

U.S. PATENT DOCUMENTS

| | | | |
|---|---|---|---|
| 2017/0187045 A1 | 6/2017 | Mori et al. | |
| 2018/0369782 A1* | 12/2018 | Hirokawa | B01J 20/28 |
| 2019/0300380 A1* | 10/2019 | Naoi | G11B 5/70642 |

FOREIGN PATENT DOCUMENTS

| | | |
|---|---|---|
| CN | 106975490 A | 7/2017 |
| CN | 108367267 A | 8/2018 |
| JP | 2004509751 A | 4/2004 |
| JP | 2006305551 A | 11/2006 |
| JP | 2016216299 A | 12/2016 |
| JP | 2017119615 A | 7/2017 |
| WO | 2017/061115 A1 | 4/2017 |
| WO | 2017/110736 A1 | 6/2017 |

OTHER PUBLICATIONS

Apr. 28, 2020 International Search Report issued in International Patent Application No. PCT/JP2020/005172.
Ishikawa, Tatsuo, et al. "Influences of metal ions on the formation of β-FeOOH particles", Corrosion Science, vol. 43, pp. 1727-1738 (2001).
Ishikawa, Tatsuo, et al. "Structures of β-FeOOH Particles Formed in the Presence of Ti(IV), Cr(III), and Cu(II) Ions", Journal of Colloid and Interface Science, vol. 250, pp. 74-81 (2002).
Mar. 1, 2023 Office Action issued in Chinese Patent Application No. 202080013168.X.

* cited by examiner

ADSORBENT PARTICLES

TECHNICAL FIELD

The present invention relates to an adsorbent particle having the crystal structure of β-iron oxyhydroxide containing a metal element other than iron or sulfur oxoacid ions. This application claims priority to Japanese Patent Application No. 2019-24913 filed on Feb. 14, 2019, the contents of which are incorporated herein.

BACKGROUND ART

In order to remove and purify substances harmful to the environment and the human body from various drainages, or to recover useful substances such as rare metals from various drainages, adsorbents, adsorption methods using the same, methods for desorbing and recovering adsorbed substances, and the like are actively studied.

For example, phosphorus is a component indispensable as a fertilizer component and also in the chemical industry, but Japan depends on imports for substantially 100% of phosphorus. On the other hand, when a large amount of phosphorus is included in drainage, eutrophication is caused, and therefore discharging such drainage is not preferred for the environment. In order to solve these problems, the removal and recovery of phosphorus compounds such as phosphates included in drainage are noted.

As adsorbents that can efficiently adsorb and recover phosphorus compounds and other anions, a large number of those comprising iron oxyhydroxide (FeOOH) as the main component are developed. For example, in patent documents 1 and 2, adsorbents comprising β-iron oxyhydroxide as the main component are described, and it is stated that the phosphate adsorption efficiency is particularly excellent.

In patent document 1, particles obtained by granulating adsorbent particles comprising β-iron oxyhydroxide as the main component, and a binder are also described, and as the binder, a titanium compound or the like is exemplified. But the effect of such a granulated adsorbent is to facilitate use by adjusting the particle diameter while keeping the adsorption performance of the adsorbent particles, and there is no statement or suggestion that adsorption performance better than that of the adsorbent particles is obtained.

In patent document 3, an adsorption medium consisting of iron oxyhydroxide solidified with an oxide and/or (oxy)hydroxide of a metal such as magnesium, aluminum, or titanium is described. As a specific example, it is stated that a product consisting of α-iron oxyhydroxide to 100% according to X-ray diffraction is obtained by reacting a mixed solution of an iron(II) salt and a salt of magnesium or the like with a base under oxidizing conditions in which Fe(II) is oxidized to Fe(III), to coprecipitate α-iron oxyhydroxide particles and a (hydr)oxide of magnesium or the like. But also in this invention, the metal oxide and/or (oxy)hydroxide function as a binder, and there is no statement or suggestion that due to this, adsorption performance is better than that of α-iron oxyhydroxide.

In patent document 4, an adsorbent consisting of hydrous iron oxide particles containing carbonate ion-derived carbon is described, and it is stated that further a metal element such as titanium may be contained. In the production method specifically described therein, a divalent iron salt solution is added to an alkali carbonate solution to produce an iron carbonate suspension in the range of pH 6 to 10, and this suspension is air-oxidized to produce trivalent hydrous iron oxide. In addition, the crystal forms specifically disclosed are those of α-iron oxyhydroxide and γ-iron oxyhydroxide, and it is difficult to obtain β-iron oxyhydroxide by the same production method. It is shown that these adsorbents have excellent adsorption performance by containing carbon, but there is no suggestion that the adsorption performance is further improved by titanium or the like.

β-Iron oxyhydroxide is characterized in that some of the hydroxyl groups are replaced by chloride ions, and it has a tunnel-like pore structure, and β-iron oxyhydroxide is known as an adsorbent for various ions. β-Iron oxyhydroxide is also known as natural mineral akaganeite or as the main component of red rust that forms easily on an iron material surface in a high salt environment.

In non-patent documents 1 and 2, β-iron oxyhydroxide is synthesized as a model of rust, and it is made clear that crystallites of β-iron oxyhydroxide are fine or amorphous specifically only in the coexistence of a titanium compound, and this is presumed as the reason why the corrosion resistance of titanium-containing iron and steel is excellent. But in non-patent documents 1 and 2, adsorbent applications are not suggested. In addition, the described particles are only those having a major axis of about 400 nm or less, and there is no suggestion that particles larger than them are produced.

In patent document 5, iron compound particles containing a β-iron oxyhydroxide crystal phase doped with an element of a transition metal such as cobalt, nickel, or chromium, or the like are described, and it is stated that such particles are excellent in oxidative catalytic activity. But adsorbent applications are not suggested. In addition, it is stated that the average particle diameter is preferably 1 to 150 nm. It is stated that as the production method, a solution containing iron ions, and a basic compound solution are mixed to convert the iron ions into a hydroxide, and it is stated that the preferred pH range at the time is 2.0 to 3.0 in order to reliably obtain particles having a small average particle diameter.

As iron oxyhydroxide containing a small amount of sulfate ions, schwertmannite is known. Schwertmannite has a different crystal system from β-iron oxyhydroxide, but has a tunnel structure, and using this as an adsorbent is also proposed. But schwertmannite is unstable, and changes easily to α-iron oxyhydroxide having poor adsorption capacity, and therefore requires a special production method for stabilization (see patent document 6 and the like).

PRIOR ART DOCUMENTS

Patent Documents

Patent Document 1: WO2017/061115
Patent Document 2: WO2017/110736
Patent Document 3: Japanese unexamined Patent Application Publication (Translation of PCT Application) No. 2004-509751
Patent Document 4: Japanese unexamined Patent Application Publication No. 2006-305551
Patent Document 5: Japanese unexamined Patent Application Publication No. 2017-119615
Patent Document 6: Japanese unexamined Patent Application Publication No. 2016-216299

Non-Patent Documents

Non-patent Document 1: T. Ishikawa et al. Corrosion Science 43 (2001), 1727-1738
Non-patent Document 2: T. Ishikawa et al. Journal of Colloid and Interface Science 250 (2002), 74-81

SUMMARY OF THE INVENTION

Object to be Solved by the Invention

It is an object to provide an adsorbent consisting of iron oxyhydroxide, having a high adsorption rate and high adsorption efficiency compared with conventional products.

Means to Solve the Object

The present inventors have studied diligently in order to make an adsorption rate and adsorption efficiency high in an adsorbent consisting of iron oxyhydroxide, compared with conventional products.

As a result, it has been found that an adsorbent exhibiting high adsorption efficiency is obtained by using in combination a compound of a metal other than iron, or a compound that produces a sulfur oxoacid ion, in the step of producing iron oxyhydroxide in an aqueous solution containing iron ions. The present invention has been completed based on the above finding.

Specifically, the present invention relates to the following inventions:

(1) An adsorbent particle having a crystal structure of β-iron oxyhydroxide, having an average crystallite diameter of 10 nm or less as measured by X-ray diffraction, wherein 90% or more of a volume of the adsorbent particle is constituted of granular crystals having a crystal particle diameter of 20 nm or less, or columnar crystals having a width of 10 nm or less and a length of 30 nm or less the adsorbent particle having a at least either of the following characteristic (A) or (B):

(A) the adsorbent particle contains a metal element other than iron in an amount of 0.1 to 20% by mass with respect to an iron element;

(B) the adsorbent particle contains sulfur oxoacid ions in an amount of 0.01 to 20% by mass in terms of a sulfur element with respect to an iron element.

(2) The adsorbent particle according to (1), wherein the metal element other than iron is at least one metal element of group 4 to group 13 other than iron.

(3) The adsorbent particle according to (1), wherein the sulfur oxoacid ions are sulfate ions.

(4) The adsorbent particle according to any one of (1) to (3), wherein the adsorbent particle has an average particle diameter of 0.01 mm to 10 mm.

(5) The adsorbent particle according to any one of (1) to (4), wherein the adsorbent particle has a BET specific surface area (S) of 200 m$^2$/g or more.

(6) The adsorbent particle according to any one of (1) to (5), wherein the adsorbent particle is an anion adsorbent.

(7) The adsorbent particle according to (6), wherein an adsorbed amount (A) in terms of phosphorus per g of an adsorbent is 35 mg or more after 24 h in a batch adsorption test performed by introducing 1 g of the adsorbent into 150 mL of a potassium dihydrogen phosphate aqueous solution having a concentration of 400 mg-P/L in terms of phosphorus and having pH adjusted at 3.5 with hydrochloric acid, and stirring at room temperature.

(8) An adsorbent particle having a crystal structure of β-iron oxyhydroxide, having an average crystallite diameter of 10 nm or less as measured by X-ray diffraction, wherein 90% or more of a volume of the adsorbent particle is constituted of granular crystals having a crystal particle diameter of 20 nm or less, or columnar crystals having a width of 10 nm or less and a length of 30 nm or less, wherein A≥87 S/(S+385) holds when a BET specific surface area is S m$^2$/g, and an adsorbed amount in terms of phosphorus per g of adsorbent after 24 h by the method according to (7) is A mg.

(9) A method for producing the adsorbent particle according to any one of (1) to (8), comprising a step of adding a base represented by YOH (wherein Y represents a monovalent atom or atomic group) to a solution comprising at least one trivalent iron compound represented by $Fe_{n1}X_{n2}$ (wherein X represents one or more atoms or atomic groups other than OH, and n1 and n2 each represent an integer of 1 or more), and at least one compound represented by $M_{n3}X'_{n4}$ (wherein either (α) M represents a metal element other than iron, and X' represents one or more atoms or atomic groups, or (β) M represents a positive atom or atomic group, and X' represents a sulfur oxoacid ion; and n3 and n4 each represent an integer of 1 or more), and optionally an electrolyte different from the trivalent iron compound represented by $Fe_{n1}X_{n2}$ and the compound represented by $M_{n3}X'_{n4}$, while adjusting pH at 3 to 6, to produce iron oxyhydroxide.

(10) The method according to (9), wherein in the step of producing iron oxyhydroxide, a concentration of a sum of electrolytes used is 10% by mass or more with respect to a total amount of raw materials.

(11) The method according to (9) or (10), optionally comprising, after the step of producing iron oxyhydroxide, a step of adding an electrolyte different from the trivalent iron compound represented by $Fe_{n1}X_{n2}$ and the compound represented by $M_{n3}X'_{n4}$, and then a step of recovering, as a water-containing cake, a precipitate comprising iron oxyhydroxide as a main component, and a step of drying the water-containing cake.

(12) The method according to (11), comprising a step of bringing into contact with water a dry solid comprising iron oxyhydroxide as a main component obtained in the previous step, and then drying the dry solid.

(13) The method according to (11) or (12), wherein in the step of drying the water-containing cake, the water-containing cake is dried in a state of containing a by-product represented by $Y_{n5}X$ (X and Y each represent the same as above, and n5 is a valence of X) and electrolytes other than the by-product in the water-containing cake in a total amount of 10% by mass or more on a dry basis.

(14) The method according to any one of (9) to (13), wherein at least one anion selected from an anion represented by $X^-$, an anion represented by $X'^-$, and an anion included in the electrolyte different from the trivalent iron compound represented by $Fe_{n1}X_{n2}$ and the compound represented by $M_{n3}X'_{n4}$ is a chloride ion.

Effect of the Invention

An adsorbent having a higher adsorbed amount than conventionally known adsorbents is obtained by the present invention, and when this is used, the recovery efficiency for a component to be adsorbed is better.

MODE OF CARRYING OUT THE INVENTION (Adsorbent Particles)

The adsorbent particles of the present invention are adsorbent particles having a crystal structure of β-iron oxyhydroxide, having an average crystallite diameter of 10 nm or less as measured by X-ray diffraction, wherein 90% or more of a volume of the particle is constituted of granular crystals having a crystal particle diameter of 20 nm or less, or columnar crystals having a width of 10 nm or less and a length of 30 nm or less, for 90% or more of the volume of the particles, the adsorbent particles having the at least either of the following characteristic (A) or (B). The characteristics of (A) and (B) both exhibit the effect of enhancing adsorption capacity, particularly the effect of enhancing surface utilization efficiency in adsorption, in the adsorbent of the present invention. Regarding the characteristics of (A) and (B), the adsorbent particles of the present invention may have only either one, or may simultaneously have both characteristics.

(A) The adsorbent particles contain a metal element other than iron in an amount of 0.1 to 20% by mass with respect to an iron element (metal element other than iron/iron element).

(B) The adsorbent particles contain sulfur oxoacid ions in an amount of 0.01 to 20% by mass in terms of a sulfur element with respect to an iron element (sulfur element/iron element).

The crystal structure of β-iron oxyhydroxide may be confirmed using X-ray diffraction (XRD) or TEM. In X-ray diffraction, a crystal form may be identified from specific diffraction peaks, and when a pattern consisting of diffraction peaks specific to β-iron oxyhydroxide is obtained, β-iron oxyhydroxide may be determined. When TEM is used, lattice spacing is obtained from a TEM image by FFT (Fast Fourier Transform), and a crystal form may be identified from specific lattice spacing. Of these, β-iron oxyhydroxide is preferably determined by X-ray diffraction.

The average crystallite diameter D is calculated from the diffraction line around 2θ=35° characteristic of β-iron oxyhydroxide in X-ray diffraction, using the following Scherrer equation:

$$D = K\lambda/\beta \cos \theta$$

wherein β represents the half-width of the true diffraction peak obtained by correcting machine width due to the apparatus, K represents the Scherrer constant, and λ represents the wavelength of X rays.

In the adsorbent particles of the present invention, the average crystallite diameter measured by this method is 10 nm or less, further preferably 6 nm or less, and more preferably 3 to 5 nm. The lower limit of the average crystallite diameter is not particularly limited, and is ordinarily on the order of 1 nm.

In the adsorbent particles of the present invention, the form of the crystals may be confirmed by transmission electron microscope (TEM) observation. Specifically, TEM observation may be performed, for example, at 4000000× magnification, and from the crystal stripes seen by it, the formation of crystals and the type and form of the crystals may be confirmed. In addition, from major axes (crystal particle diameters) in a range consisting of a single crystal stripe pattern, the average crystallite diameter may also be calculated. By such a method, it is found that regarding the adsorbent particles of the present invention, 90% or more of a volume of the absorbent particle is constituted of granular crystals having a crystal particle diameter of 20 nm or less (preferably 5 nm or less), or columnar crystals having a width of 10 nm or less (preferably 5 nm or less) and a length of 30 nm or less (preferably 20 nm or less). Here, the "granular crystals" mean excluding needle-like or plate-like crystals, and more specifically, the major axis/minor axis ratio of the crystals is 3 or less. For the crystal form of the adsorbent particles of the present invention, the adsorbent particles mainly comprise such granular crystals having a particle diameter of 20 nm or less, or columnar crystals having a width of 10 nm or less and a length of 30 nm or less, and their proportion accounts for 90% or more in volume ratio. Further, this proportion is preferably 100%.

The lower limit of the size of the crystals accounting for 90% or more of the volume of the particles is not particularly limited, and usually, the particle diameter of the granular crystals is 1 nm or more, and the width or length of the columnar crystals is 1 nm or more or 3 nm or more.

The adsorbent particles of the present invention are characterized, as the characteristic (A), by containing a metal element other than iron in an amount of 0.1 to 20% by mass with respect to an iron element. The content of the metal element other than iron is more preferably 0.5 to 10% by mass with respect to the iron element. When the content of the metal element other than iron is less than 0.1% by mass with respect to the iron element, the adsorption performance is not much different from that of conventional adsorbent particles. On the other hand, when the content of the metal element other than iron exceeds 20% by mass with respect to the iron element, the structure of β-iron oxyhydroxide is not maintained, and therefore the adsorption performance is rather poor.

The metal element other than iron in the present invention is not necessarily limited, and may be one type, or a plurality of types may be used in combination. As the metal element other than iron, sodium, potassium, magnesium, calcium, scandium, yttrium, titanium, zirconium, vanadium, niobium, tantalum, chromium, molybdenum, tungsten, manganese, ruthenium, osmium, cobalt, rhodium, iridium, nickel, palladium, platinum, copper, silver, gold, zinc, cadmium, aluminum, gallium, indium, germanium, tin, lead, or the like is exemplified.

Among these, the metal element other than iron is preferably a metal element of group 4 to group 13 other than iron. Specifically, titanium, zirconium, vanadium, niobium, tantalum, chromium, molybdenum, tungsten, manganese, ruthenium, osmium, cobalt, rhodium, iridium, nickel, palladium, platinum, copper, silver, gold, zinc, aluminum, gallium, indium, or the like is exemplified. Among these, titanium, zirconium, chromium, cobalt, nickel, copper, and aluminum are particularly preferred.

The adsorbent particles of the present invention are characterized, as the characteristic (B), by containing sulfur oxoacid ions in an amount of 0.01 to 20% by mass in terms of a sulfur element with respect to an iron element. The content of the sulfur element is more preferably 0.1 to 20% by mass, and particularly preferably 0.5 to 10% by mass with respect to the iron element. When the content of the sulfur element is less than 0.01% by mass with respect to the iron element, the adsorption performance is not much different from that of conventional adsorbent particles. On the other hand, when the content of the sulfur element exceeds 20% by mass with respect to the iron element, the structure of β-iron oxyhydroxide is not maintained, and therefore the adsorption performance is rather poor.

As the sulfur oxoacid ion, a sulfate ion ($SO_4^{2-}$), a sulfite ion ($SO_3^{2-}$), a thiosulfate ion ($S_2O_3^{2-}$), a dithionite ion ($S_2O_4^{2-}$), a pyrosulfite ion ($S_2O_5^{2-}$), a dithionate ion ($S_2O_6^{2-}$), or the like is exemplified, and in the present invention, the anions also include their protonated anions (for example, a hydrogen sulfate ion $HSO_4^-$ with respect to a sulfate ion). Among these, a sulfate ion or a hydrogen sulfate ion is preferred.

β-Iron oxyhydroxide is characterized in that some of the hydroxyl groups are replaced by chloride ions. Also for the adsorbent particles of the present invention, based on the same characteristic, some of the hydroxyl groups are further replaced by sulfur oxoacid ions while the adsorbent particles have the crystal structure of β-iron oxyhydroxide, and thus the adsorption efficiency may be further enhanced.

The average particle diameter (d50 based on volume) of the adsorbent particles of the present invention is not necessarily limited, and is preferably 0.01 mm to 10 mm suitable for use as an adsorbent, and more preferably 0.2 mm to 1.0 mm.

The adsorbent particles of the present invention may be adjusted in the above average particle diameter range by grinding a large aggregate, but as described later for the production method, when the step of bringing an adsorbent once dried into contact with water, and then drying the adsorbent is adopted, an average particle diameter in this range is naturally obtained.

The BET specific surface area of the adsorbent particles of the present invention is preferably 200 $m^2/g$ or more. Thus, high efficiency adsorption is possible. The upper limit of the BET specific surface area is not particularly limited, and is usually 450 $m^2/g$ or less. The method for measuring the BET specific surface area is not particularly limited, and a known method may be used, and, for example, a BET three-point method using nitrogen gas may be used.

As the noteworthy characteristics of the adsorbent particles of the present invention, not only simply a large specific surface area as in the preceding paragraph, but high surface utilization efficiency in adsorption is exemplified. This utilization efficiency may be estimated by the adsorbed amount per specific surface area. More specifically, it is recommended that the specific surface area and the adsorbed amount of target anions are each measured, and from these, the adsorbed amount of the target anions per specific surface area is calculated.

When both the specific surface area and surface utilization efficiency are excellent, a particularly excellent adsorbed amount is achieved.

Further, the total pore volume in the adsorbent particles of the present invention is preferably 0.18 ml/g or more. The upper limit of the total pore volume is not particularly limited, and is usually 0.4 ml/g or less. The total pore volume may be measured by a gas adsorption one-point method.

In addition, in the adsorbent particles of the present invention, the peak of the pore diameter distribution in their mesopore to macropore region (pore diameter 1.0 to 100 nm) is preferably in the range of pore diameters of 2.5 to 5 nm. Further, of the pore volumes in the mesopore to macropore region, pores in the range of pore diameters of 2.5 nm or more preferably account for 50% by volume or more. The pore diameter distribution may be measured by a gas adsorption three-point method.

For the structural characteristics of the adsorbent particles of the present invention described above, compared with the structural characteristics disclosed in patent document 2, no significant differences are found except that the crystal particle diameter tends to be somewhat small. The most important difference is that the adsorbent particles of the present invention contain (A) a metal element other than iron in an amount of 0.1 to 20% by mass with respect to an iron element, or (B) sulfur oxoacid ions in an amount of 0.01 to 20% by mass in terms of a sulfur element with respect to an iron element. Thus, particularly the surface utilization efficiency in adsorption is significantly excellent as described below, and therefore the adsorbent particles of the present invention may achieve a significantly high adsorbed amount compared with conventional analogous adsorbents.

(Adsorbed Amount and Adsorption Rate)

The adsorbed amount and the adsorption rate with adsorbent particles may be measured, for example, by the following batch adsorption test when a phosphate is a target to be adsorbed.

150 mL of a potassium dihydrogen phosphate aqueous solution having a concentration of 400 mg-P/L in terms of phosphorus and having pH adjusted at a fixed value with hydrochloric acid is prepared. 1 g of adsorbent particles are introduced thereinto, and the mixture is stirred at room temperature. After a fixed time, the aqueous solution is sampled, the phosphate ion concentration is measured, and the adsorbed amount is obtained. In order to estimate the maximum adsorbed amount by this method, this sampling and measurement should be repeated until the adsorbed amount is substantially fixed, but measurement may be performed, for example, after 24 h, for simple comparison.

In the adsorbent particles of the present invention, the adsorbed amount in terms of phosphorus is 35 mg/g of adsorbent or more, and preferably 40 mg/g of adsorbent or more after 24 h when the pH of the aqueous solution is adjusted at 3.5 in this method.

The adsorbent particles of the present invention are excellent not only in the maximum adsorbed amount but also in the adsorption rate, and the adsorbed amount in terms of phosphorus is 15 mg or more after 1 h under the same conditions.

On the other hand, in the known adsorbents disclosed in patent documents 1 and 2 and the like, the maximum adsorbed amount and the adsorption rate are significantly excellent in the acidic region, but so excellent an effect is not obtained at pH 5 or more. In contrast to this, in the adsorbent particles of the present invention, a maximum adsorbed amount and an adsorption rate close to those in the acidic region are obtained even at pH 5 or more. In the adsorbent particles of the present invention, the adsorbed amount in terms of phosphorus is 30 mg or more after 24 h, and 15 mg or more after 1 h when the pH of the aqueous solution is adjusted at 6 in the above method.

The surface utilization efficiency in adsorption may be estimated as follows.

By dividing an adsorbed amount for a particular target substance, for example, the above phosphate adsorbed amount A (unit: mg-P/g) after 24 h, by a BET specific surface area S (unit: $m^2/g$), a value A/S (unit: mg-P/$m^2$) representing an adsorbed amount per surface area is obtained. This value may be seen as a value representing surface utilization efficiency.

In the adsorbent particles of the present invention, for the A/S value, a value of 0.12 mg-P/$m^2$ or more, and preferably 0.14 mg-P/$m^2$ or more is obtained.

Particularly in the adsorbent particles of the present invention, the relationship A≥87 S/(S+385) is obtained. In conventionally known adsorbents comprising iron oxyhydroxide as the main component, A<87 S/(S+385) holds, and the above formula has not been satisfied, but it has become possible for the first time in the adsorbent particles of the present invention to satisfy this.

Adsorbent particles having a crystal structure of β-iron oxyhydroxide, having an average crystallite diameter of 10 nm or less as measured by X-ray diffraction, and comprising granular crystals having a crystal particle diameter of 20 nm or less, or columnar crystals having a width of 10 nm or less and a length of 30 nm or less, for 90% or more of the volume of the particles, the adsorbent particles satisfying the relationship of A≥87 S/(S+385) by the above measurement method, are included in the technical scope of the present invention.

Meanwhile, in non-patent documents 1 and 2, it is made clear that in the synthesis of β-iron oxyhydroxide, the average crystallite diameter and particle diameter of β-iron oxyhydroxide are fine in the coexistence of a titanium compound. The shape of the particles of β-iron oxyhydroxide disclosed therein is only an elongated spindle shape, but such a structure is not found in the adsorbent particles of the present invention.

Moreover, in non-patent documents 1 and 2, a similar effect is not seen at all even if chromium, nickel, and copper are used instead of titanium. In contrast, in the present invention, it is confirmed that similar adsorbent particles are obtained even if these metal elements are used instead of titanium.

(Production Method)

A method for producing adsorbent particles according to the present invention is characterized by comprising the step of adding a base to a solution comprising at least one trivalent iron compound and at least one compound selected from a compound of a metal other than iron and a compound containing a sulfur oxoacid ion, while adjusting the pH at 3 to 6, to produce iron oxyhydroxide.

The trivalent iron compound should be a compound soluble in the solvent of the solution, and is specifically represented by $Fe_{n1}X_{n2}$. Here, X represents one or more atoms or atomic groups other than OH, and n1 and n2 each represent an integer of 1 or more. This trivalent iron compound is preferably an iron salt, and may be a simple salt in which X is single, but may be a double salt containing a plurality of components as X. In this case, as n2, different numbers corresponding to the components of X may be taken. As X, a chlorine (Cl) ion preferably contained as a raw material as described later is preferably contained, and as the trivalent iron compound, iron(III) chloride is more preferably contained. As the compound that may be used as the trivalent iron compound, in addition to this, iron(III) nitrate, iron(III) sulfate, or the like is exemplified.

The compound of the metal other than iron should be a compound soluble in the solvent of the solution, and is specifically represented by $M_{n3}X'_{n4}$. Here, M represents a metal element other than iron, X' represents one or more atoms or atomic groups, and n3 and n4 each represent an integer of 1 or more. The metal element other than iron is preferably a group 4 to group 13 transition metal element other than iron as described above, and specifically, titanium, zirconium, vanadium, niobium, tantalum, chromium, molybdenum, tungsten, manganese, ruthenium, osmium, cobalt, rhodium, iridium, nickel, palladium, platinum, copper, silver, gold, zinc, aluminum, gallium, indium, or the like is exemplified. Particularly, the metal element other than iron is preferably at least one element selected from titanium, zirconium, chromium, cobalt, nickel, copper, and aluminum. More specifically, as a titanium compound, a tetravalent titanium compound is preferred; as a zirconium compound, a tetravalent zirconium compound is preferred; as a chromium compound, a trivalent chromium compound is preferred; as a cobalt compound, a divalent cobalt compound is preferred; as a nickel compound, a divalent nickel compound is preferred; as a copper compound, a divalent copper compound is preferred; and as an aluminum compound, a trivalent aluminum compound is preferred. The metal compound containing no iron represented by $M_{n3}X'_{n4}$ is preferably a salt of a metal represented by M, or a hydrolyzable compound that may produce a hydroxide of a metal represented by M by hydrolysis, and M and/or X' may be single, but the metal compound may be a compound containing a plurality of components as M and/or X'. In this case, as n3 and n4, different numbers corresponding to the components of M and X' may be taken. As the hydrolyzable compound of a metal, a metal alkoxide or a metal complex is preferred. Compounds that may be used as the metal compounds are exemplified as follows: titanium nitrate, titanium sulfate, titanium oxysulfate, tetramethoxytitanium, tetraethoxytitanium, tetraisopropoxytitanium, diisopropoxybis(ethylacetoacetate)titanium, diisopropoxybis(acetylacetonate)titanium, or propanedioxytitanium bis(ethylacetoacetate) as the tetravalent titanium compound; zirconium oxychloride, zirconium nitrate, zirconium oxynitrate, zirconium sulfate, zirconium oxysulfate, zirconium tetrakis(acetylacetonate), di-n-butoxybis(acetylacetonate) zirconium, or zirconium tetrakis(ethylacetoacetate) as the tetravalent zirconium compound; chromium chloride, chromium nitrate, or chromium sulfate as the trivalent chromium compound; cobalt chloride, cobalt nitrate, or cobalt sulfate as the divalent cobalt compound; nickel chloride, nickel nitrate, or nickel sulfate as the divalent nickel compound; copper chloride, copper nitrate, or copper sulfate as the divalent copper compound; or aluminum chloride, aluminum nitrate, aluminum sulfate, aluminum isopropylate, ethylacetoacetate aluminum diisopropylate, or aluminum bisethylacetoacetate-monoacetylacetonate as the trivalent aluminum compound.

The sulfur oxoacid ion is as described above. X' in the compound represented by $M_{n3}X'_{n4}$ may be a sulfur oxoacid ion, and in that case, M is a positive atom or atomic group that is a positive ion in the solvent used in the production method. M in this case may be, in addition to the above-described group 4 to group 13 transition metal element other than iron, hydrogen, an alkali metal, an alkaline earth metal, ammonium, a primary to tertiary amine, a quaternary ammonium, or the like.

The solvent of the solution is a solvent that may dissolve the trivalent iron compound represented by $Fe_{n1}X_{n2}$ and the compound represented by $M_{n3}X'_{n4}$, and preferably a polar solvent, more preferably an aqueous solvent containing water as the main component, and particularly preferably water.

The solution may contain an electrolyte different from the trivalent iron compound represented by $Fe_{n1}X_{n2}$ and compound represented by $M_{n3}X'_{n4}$ (referred to as "another electrolyte"), as needed. The purpose of this is to supply chloride ions, or to adjust electrolyte concentration, as described later. The purpose may be to provide the produced adsorbent particles with effects such as further improving adsorption performance, particularly improving adsorption performance for a particular component, and adjusting strength as long as not impairing the effect of the present invention, by adding a metal component different from the metal components included in the trivalent iron compound represented by $Fe_{n1}X_{n2}$ and the compound represented by $M_{n3}X'_{n4}$.

Generally, as a method for synthesizing iron oxyhydroxide, there is also a method providing the step of using a divalent iron compound as a raw material, and further oxidizing divalent iron to trivalent iron, but it is difficult to synthesize β-iron oxyhydroxide by such a method, and the method of the present invention using a trivalent iron compound as a raw material is advantageous. However, as the another electrolyte, a divalent iron compound may be contained.

The base is specifically represented by YOH. Here, Y represents a monovalent atom or atomic group. As this base, an alkali metal hydroxide such as sodium hydroxide, potassium hydroxide, or lithium hydroxide, ammonia water, or the like is exemplified, and among these, sodium hydroxide is preferred.

In the production method of the present invention, the base is added to the solution, while the pH is adjusted at 3 to 6, to produce iron oxyhydroxide. The pH range is preferably pH 3.3 to 6.

Generally, as a method for synthesizing iron oxyhydroxide, there is also a method of adjustment in the neutral to alkaline region exceeding pH 6, but it is difficult to synthesize β-iron oxyhydroxide by such a method, and the method of the present invention with adjustment at pH 3 to 6 is advantageous. pH less than 3 is not preferred because not only is time required for the synthesis of iron oxyhydroxide, but the excellent properties of the adsorbent particles of the present invention may not be obtained.

As the method for adding a base in order to adjust pH as described above, a method of slowly adding a base while stirring the solution is preferred. When a solid base is used, a method of previously dissolving the base in an appropriate solvent, and adding this solution is preferred. The solvent that dissolves this base is preferably one that mixes easily with the solution, more preferably the same as the solvent of the solution, and particularly preferably water.

The temperature at which the above step is performed is not particularly limited as long as it is not a temperature at which each solution used freezes, or evaporates rapidly. The temperature at which the above step is performed is preferably 4° C. to 50° C., and particularly preferably 4° C. to 15° C. because the average crystallite diameter is small.

The adsorbent particles of the present invention obtained by the above method have an average crystallite diameter of 10 nm or less as measured by X-ray diffraction, and comprise granular crystals having a crystal particle diameter of 20 nm or less (preferably 5 nm or less), or columnar crystals having a width of 10 nm or less (preferably 5 nm or less) and a length of 30 nm or less (preferably 20 nm or less), for 90% or more of the volume of the particles.

It is considered that the excellent adsorption performance of the adsorbent particles of the present invention is due to using a compound of a metal other than iron or a sulfur oxoacid ion in combination in the production process, in addition to the above structural characteristics.

On the other hand, the methods for synthesizing β-iron oxyhydroxide disclosed in non-patent documents 1 and 2 are methods in which an aqueous solution containing iron(III) chloride in the presence of a titanium compound is aged at room temperature, or heated and aged, to deposit iron oxyhydroxide, and basically different from the present invention.

When a titanium compound is not used in combination in a similar method, β-iron oxyhydroxide having an average crystallite diameter and a particle major axis on the order of 100 to 400 nm is produced. When a titanium compound is used in combination with this, the average crystallite diameter and the particle major axis decrease sharply with the molar ratio Ti/Fe representing the amount of the titanium compound used with respect to iron chloride in the raw material liquid, and at a molar ratio on the order of 0.01, the average crystallite diameter is on the order of 10 nm. When the molar ratio increases further, amorphous iron oxyhydroxide, which is not β type crystals, is produced.

Such a visible change in structural properties due to the combined use of the titanium compound is not seen in the method for producing adsorbent particles according to the present invention, and it is suggested that there is an essential difference between both methods.

It is considered that the cause of this lies in the difference in the stage of producing iron oxyhydroxide. In the methods of non-patent documents 1 and 2, a method of aging an aqueous solution without the addition of a base is adopted. This method requires a long time for the production of iron oxyhydroxide (about 1 year at room temperature, and about 1 day even at 50° C.), and when a titanium compound is not used in combination, large crystals on the order of 100 to 400 nm are obtained. It is presumed that in this process, titanium has a large influence on the outer shape of the crystals. On the other hand, in the method of the present invention, by adding a base, iron oxyhydroxide is produced in a short time, and even when a titanium compound is not used in combination, the produced crystals are seen as having a major axis of 30 nm or less. It is presumed that in such circumstances, a titanium compound does not have a large influence on the outer shape of the crystals.

In this manner, the method of the present invention is far better than the methods of non-patent documents 1 and 2 in that β-iron oxyhydroxide particles having excellent adsorption performance are obtained in a short time and moreover without precisely setting the amount of the titanium compound used.

In the production method of the present invention, a suspension or slurry containing β-iron oxyhydroxide particles on the nanometer to micrometer order as the main component is obtained in the above step. This may also be used as an adsorbent as it is, but when further the following processing method is used, it is also easy to provide a size easily used as an adsorbent, with an average particle diameter of 0.01 mm to 10 mm.

The step of adding an electrolyte different from the trivalent iron compound represented by $Fe_{n1}X_{n2}$ and compound represented by $M_{n3}X'_{n4}$ to the above suspension or slurry as needed may be added. In this step, the electrolyte is preferably completely dissolved in the liquid after the addition, and specifically, a solution of the electrolyte may be previously made, and added, or the electrolyte may be added as a solid, and then completely dissolved. The purpose of this addition is the same as the purpose described regarding the above-described "another electrolyte". The above-described "another electrolyte" and the electrolyte added in this step are hereinafter together referred to as "another electrolyte".

As the production method of the present invention, a production method comprising, in addition to the above step, the step of recovering, as a water-containing cake, the precipitate comprising the produced iron oxyhydroxide as the main component, and the step of drying the water-containing cake is preferred.

As the recovery step, recovery should be performed by a usually used method such as filtration or centrifugation, for separation from the liquid component. Thus, a water-containing cake comprising iron oxyhydroxide as the main component is obtained.

A solid comprising iron oxyhydroxide as the main component is obtained from this water-containing cake by drying.

Further, the step of bringing into contact with water the dry solid comprising iron oxyhydroxide as the main component obtained in the above step, and then drying the dry solid is preferably added. It is considered that the dry solid obtained in the above step contains, in addition to iron oxyhydroxide, which is the main component, a large amount of water-soluble impurities, and therefore these are dissolved by contact with water and removed, and leave pores, and the specific surface area increases, and the number of anion adsorption sites also increases. Adsorbent particles having particularly excellent adsorption performance are obtained by this step. In addition, the solid collapses naturally by this step, and grinding is easy also when a smaller particle diameter is necessary.

The content of the water-soluble impurities is preferably increased to a fixed value or more in the sense of further improving the adsorption performance. Specifically, either (1) a method of setting the concentration of the sum of the electrolytes contained in the raw materials in the iron oxyhydroxide production step at 10% by mass or more with respect to all components of the raw materials finally included in the step of producing iron oxyhydroxide, or (2) a method of performing drying in a state in which the by-product and another electrolyte are contained in the water-containing cake in a total amount of 10% by mass or more on a dry basis is preferred. By using these methods in combination with the combined use of a compound of a metal other than iron indispensable in the present invention, synergistic improvement of the adsorption performance may be expected.

(Method 1)

In the step of producing iron oxyhydroxide, the concentration of the sum of the electrolytes used is set at 10% by mass or more with respect to the total amount of the raw materials before iron oxyhydroxide is produced, that is, the total of the solvent, the compounds represented by $Fe_{n1}X_{n2}$, $M_{n3}X'_{n4}$, and YOH (wherein X, M, Y, n1, n2, n3, and n4 each represent the same as above), and the electrolyte different from the compounds. Thus, the amount of the water-soluble impurities in the dry solid increases, and adsorbent particles having particularly excellent adsorption performance are obtained.

In the step of adding a base while adjusting the pH at 3 to 6, when the sum concentration of the electrolytes is high, the viscosity of the solution increases with the addition of the base, and mixing may be hindered. In order to prevent this, by previously increasing the electrolyte concentration of the solution, and setting the base solution to be added, at a relatively low concentration, finally the target electrolyte sum concentration may be achieved.

(Method 2)

In the step of drying the water-containing cake, the total amount of a by-product represented by $Y_{n5}X$ (X and Y each represent the same as above, and n5 is the valence of X) and the electrolytes other than the by-product in the water-containing cake is set at 10% by mass or more on a dry basis. Thus, adsorbent particles having particularly excellent adsorption performance are obtained.

As the method 2, the method of increasing the electrolyte content in the raw materials described in the method 1 may also be utilized, but in addition, a method in which the step of adding another electrolyte to the suspension comprising iron oxyhydroxide, and dissolving it is added after the iron oxyhydroxide production step and before the iron oxyhydroxide recovery step may also be utilized.

The above two drying steps are preferably performed at 140° C. or less, and more preferably performed at 100 to 140° C. For the drying temperature, at low temperature, time is required, which is not suitable for efficient production. At high temperature, the number of anion adsorption sites tends to decrease, and further at high temperature, iron oxyhydroxide changes to iron oxide, which are not preferred. The drying may be performed in air, in a vacuum, or in an inert gas.

β-Iron oxyhydroxide is characterized in that some of the hydroxyl groups are replaced by chloride ions. In order to supply these chloride ions, at least one anion selected from an anion represented by $X^-$ and an anion represented by $X'^-$ (wherein X and X' each represent the same as above), and the anion included in the another electrolyte contained as needed, which are the indispensable components in the method of the present invention, preferably contains a chloride ion.

Further, a chloride ion is preferably contained as the anion represented by $X^-$, and at least one trivalent iron compound represented by $Fe_{n1}X_{n2}$ is particularly preferably ferric chloride ($FeCl_3$).

Any of the above dry solids may be converted into adsorbent particles having an average particle diameter of 0.01 mm to 10 mm easily used as an adsorbent, by usually used methods such as grinding, and classification by sieving or the like. Even if grinding is not positively performed, adsorbent particles in this range are naturally obtained when the step of bringing into contact with water the dry solid comprising iron oxyhydroxide as the main component, and then drying the dry solid is utilized. The average particle diameter of the adsorbent particles is more preferably 0.2 mm to 1.0 mm.

It is also easy to further grind the above adsorbent particles to obtain adsorbent fine particles having an average particle diameter below 0.01 mm, if necessary. As the grinding method, either dry grinding or wet grinding is possible. Particularly when the adsorbent particles are wet-ground to an average particle diameter on the order of 1 μm or less in a liquid such as water, a dispersion solution of an adsorbent comprising the liquid as a dispersion medium is obtained, and a stable nanodispersion solution having an average particle diameter on the order of 0.1 μm or less may also be obtained.

Further, by granulating the adsorbent particles and/or the adsorbent fine particles obtained above, or supporting them on a support, an adsorbent formed in an easily utilized size and exhibiting adsorption performance similar to that of the adsorbent particles and/or adsorbent fine particles may also be produced.

EXAMPLES

The present invention will be explained more specifically below referring to Examples, but the present invention is not intended to be limited to the following Examples.

Measurement Methods (Powder X-Ray Diffraction)

The X-ray diffraction (XRD) pattern was measured using an X-ray diffraction apparatus Ultima IV (manufactured by Rigaku Corporation). For the measurement, a CuKα tube was used. The average crystallite diameter was calculated from XRD according to the Scherrer equation.
(Specific Surface Area)

The specific surface area was measured by a gas adsorption method using a specific surface area measuring apparatus MacsorbHM 1210 (manufactured by Mountech Co., Ltd.).
(Total Pore Volume)

After pretreatment at 100° C. for about 15 h, the total pore volume was measured by a nitrogen gas adsorption one-point method using a gas adsorption measuring apparatus 3FLEX manufactured by Micromeritics.
(Pore Diameter Distribution)

The pore diameter distribution was measured by a BET three-point method using nitrogen gas.
(TEM Observation and FFT Analysis)

The TEM (transmission electron microscope) observation of a sample was performed using a transmission electron microscope JEM-2100F (manufactured by JEOL Ltd., acceleration voltage 200 kV).
(Content of Chloride Ions in Iron Oxyhydroxide)

An iron oxyhydroxide sample was dissolved in 3 M sulfuric acid, and then the solution was diluted with an alkali solution to precipitate iron. The solution was filtered through a filter, and the filtrate was recovered. Quantification was performed by ion chromatography (model DX-500 manufactured by Nippon Dionex K.K.).
(Energy-Dispersive X-Ray Spectroscopy)

Energy-dispersive X-ray spectroscopy (EDS) was performed using an atomic resolution analytical electron microscope JEM ARM200F (manufactured by JEOL Ltd., acceleration voltage 60 kV) and a silicon drift detector (manufactured by JEOL Ltd.), and the distribution of a metal other than iron and sulfur was observed.

Example 1

A 25% by mass sodium hydroxide (NaOH) aqueous solution was dropped into a raw material aqueous solution containing 14.0% by mass of ferric chloride ($FeCl_3$) and 1.1% by mass of titanium sulfate ($Ti(SO_4)_2$) (the titanium element content was 4.6% by mass with respect to the iron element, and the sulfur element content was 6.0% by mass with respect to the iron element) at a temperature of 15° C. or less, while the pH was adjusted at 5 or less, to cause a reaction with the final added amount of NaOH set at $NaOH/FeCl_3$ (molar ratio)=3.13, to obtain a particle suspension of iron oxyhydroxide. The concentration of the sum of ferric chloride and sodium hydroxide in the above was 15.8% by mass.

The suspension was filtered, and then the residue was dried in air at 120° C. to obtain iron oxyhydroxide particles (1) containing sodium chloride (NaCl).

The iron oxyhydroxide particles (1) were washed with ion-exchanged water, and further dried in air at 50° C. to obtain iron oxyhydroxide particles (2).

The particle diameter of the iron oxyhydroxide particles (2) obtained by the above was 0.1 mm to 5 mm for 90% by mass or more. It was confirmed by X-ray diffraction that the crystal structure was that of β-iron oxyhydroxide, and the average crystallite diameter was 3.0 nm.

Figure 1:
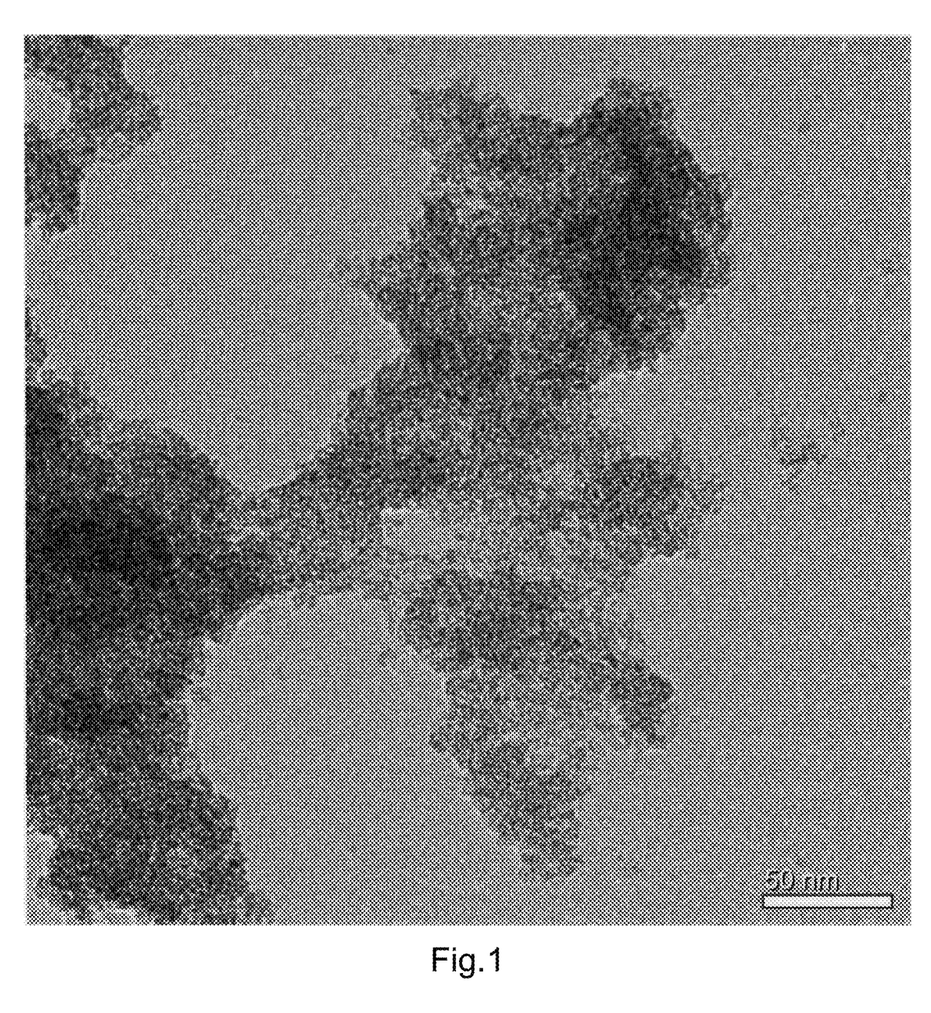
FIG. 1 is a diagram showing a photograph of an iron oxyhydroxide particle obtained in Example 1 taken by a transmission electron microscope (TEM) (the length of the scale in the photograph: 50 nm).
Figure 2:
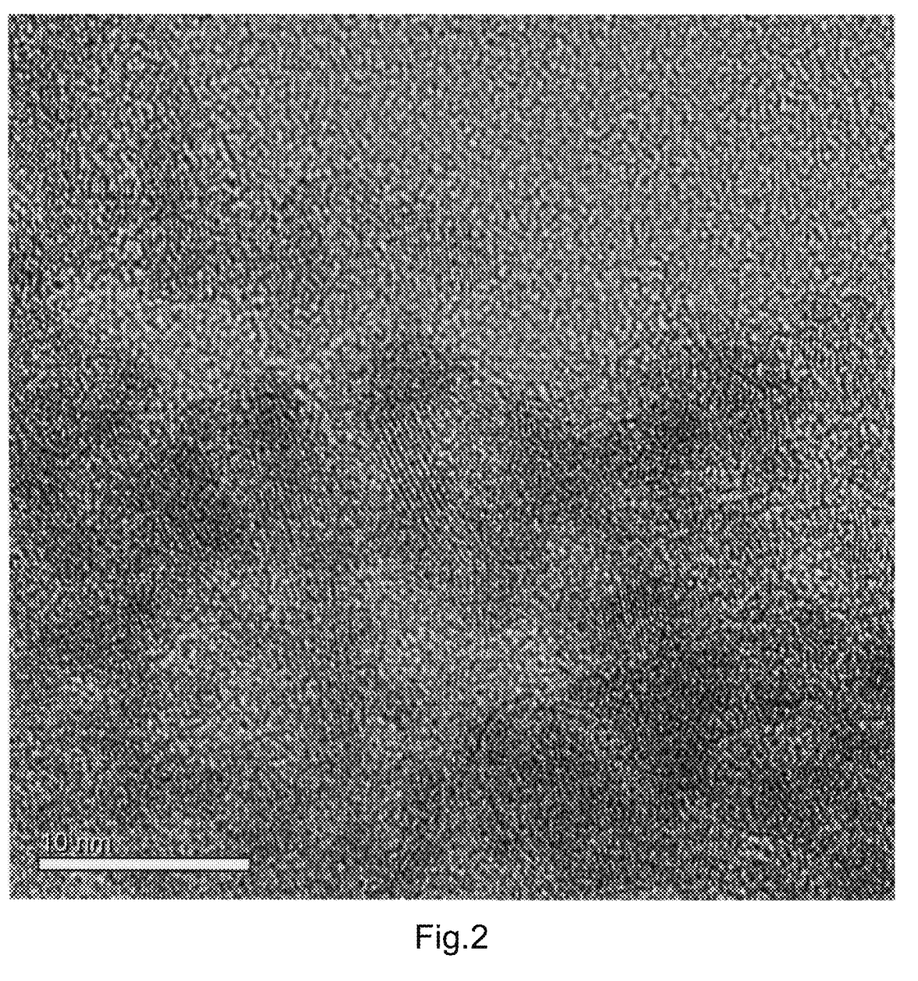
FIG. 2 is a diagram showing a high magnification photograph of an iron oxyhydroxide particle obtained in Example 1 taken by a transmission electron microscope (TEM) (the length of the scale in the photograph: 10 nm).

The state in transmission electron microscope (TEM) observation is shown in FIG. 1, and a photograph at higher magnification is shown in FIG. 2. Most of the crystallites according to TEM observation had a granular shape having a size of 2 nm or less, or a columnar shape having a width of about 2 nm and a length of about 10 nm. The specific surface area was 240 m$^2$/g, the total pore volume was 0.14 ml/g, and the peak of the pore diameter distribution was about 1.4 nm. It was confirmed that the titanium element and the sulfur element (sulfate ion-derived) were uniformly distributed in the crystals.

Examples 2 to 12

Iron oxyhydroxide particles were obtained as in Example 1 except that instead of titanium sulfate, tetraisopropoxytitanium ($Ti(O^iPr)_4$), zirconium oxychloride ($ZrOCl_2$), cobalt (II) sulfate ($CoSO_4$), chromium(III) chloride ($CrCl_3$), chromium(III) sulfate ($Cr_2(SO_4)_3$), nickel(II) chloride ($NiCl_2$), nickel(II) sulfate ($NiSO_4$), copper(II) chloride ($CuCl_2$), copper(II) sulfate ($CuSO_4$), aluminum sulfate ($Al_2(SO_4)_3$), and sodium sulfate ($Na_2SO_4$) were used.

It was confirmed by X-ray diffraction that the crystal structure was that of β-iron oxyhydroxide. Most of the crystallites according to TEM observation had a granular shape having a size of 5 to 10 nm, or a columnar shape having a width of 5 to 10 nm and a length of 8 to 20 nm. It was confirmed that the metal element other than iron or the sulfur element (sulfate ion-derived) was uniformly distributed in the crystals. The average crystallite diameter and the specific surface area were as described in the table below.

Comparative Example 1

A 12 mol/L aqueous solution of sodium hydroxide (NaOH) was dropped into a 0.764 mol/L aqueous solution of ferric chloride ($FeCl_3$) at room temperature, while the pH was adjusted at 6 or less, to cause a reaction with the final added amount of NaOH set at $NaOH/FeCl_3$ (molar ratio)= 2.83, to obtain a particle suspension of iron oxyhydroxide. The concentration of the sum of ferric chloride and sodium hydroxide in the above was 17.6% by mass.

The suspension was filtered, and then the residue was dried in air at 120° C. to obtain iron oxyhydroxide particles (1) containing sodium chloride (NaCl).

The iron oxyhydroxide particles (1) were washed with ion-exchanged water, and further dried in air at 120° C. to obtain iron oxyhydroxide particles (2).

The particle diameter of the iron oxyhydroxide particles (2) obtained by the above was 0.1 mm to 5 mm for 90% by mass or more. It was confirmed by X-ray diffraction that the crystal structure was that of β-iron oxyhydroxide, and the average crystallite diameter was 5.4 nm.

Most of the crystallites according to TEM observation had a granular shape having a size on the order of 2 to 10 nm. The specific surface area was 245 m$^2$/g, and the total pore volume was 0.21 ml/g. The peak of the pore diameter distribution was about 3.5 nm.

Measurement Example 1 (Batch Phosphate Adsorption Test of Adsorbent Particles)

Potassium dihydrogen phosphate was dissolved in ion-exchanged water, and the pH was adjusted at 3.5 and 6.0 with hydrochloric acid and sodium hydroxide respectively to prepare test liquids G and H having a concentration of 400 mg-P/L (concentration of phosphorus).

1 g of particles obtained by classifying each of the adsorbents of Examples 1 to 11 and Comparative Example 1 into 0.25 mm to 0.5 mm by a sieve were added to 150 mL of each of the test liquids G and H, and then each mixture was stirred to perform an adsorption test. After a predetermined time, the liquid was collected, and the solids were separated by a filter syringe. The phosphorus concentration in the solution was analyzed by ICP (inductively coupled plasma), and the adsorbed amount was calculated.

These results are shown in Table 1. The adsorbed amount after 24 h was divided by the specific surface area to estimate the surface utilization efficiency in phosphate adsorption.

TABLE 1

| | Metal element other than iron | Sulfur oxoacid ion | Average crystallite diameter (nm) | Specific surface area (m²/g) | Phosphorus absorbed amount A after 24 h (mg-P/g) | Phosphorus absorbed amount per specific surface area (mg-P/m²) |
|---|---|---|---|---|---|---|
| Example 1 | Ti | $SO_4^{2-}$ | 3.0 | 240 | 38.6 | 0.161 |
| Example 2 | Ti | — | 4.5 | 250 | 42.8 | 0.171 |
| Example 3 | Zr | — | 5.0 | 232 | 45.6 | 0.197 |
| Example 4 | Co | $SO_4^{2-}$ | 4.1 | 268 | 43.1 | 0.161 |
| Example 5 | Cr | — | 4.2 | 253 | 50.6 | 0.200 |
| Example 6 | Cr | $SO_4^{2-}$ | 4.2 | 273 | 42.5 | 0.156 |
| Example 7 | Ni | — | 3.9 | 238 | 38.5 | 0.162 |
| Example 8 | Ni | $SO_4^{2-}$ | 4.0 | 256 | 37.3 | 0.146 |
| Example 9 | Cu | — | 3.9 | 277 | 40.4 | 0.146 |
| Example 10 | Cu | $SO_4^{2-}$ | 4.4 | 257 | 39.6 | 0.154 |
| Example 11 | Al | $SO_4^{2-}$ | 4.1 | 235 | 50.7 | 0.216 |
| Example 12 | — | $SO_4^{2-}$ | 4.9 | 250 | 39.3 | 0.157 |
| Comparative Example 1 | — | — | 5.4 | 245 | 33.2 | 0.135 |

From the above results, it was made clear that in the adsorbent particles of the present invention, the adsorbed amount of the phosphate in the batch test was significantly high compared with the adsorbent particles of the Comparative Example. It was made clear that the adsorbent particles of the present invention were significantly excellent compared with the conventional adsorbent, particularly in terms of surface utilization efficiency in adsorption.

The invention claimed is:

1. An adsorbent particle having a crystal structure of β-iron oxyhydroxide, having an average crystallite diameter of 10 nm or less as measured by X-ray diffraction, wherein 90% or more of a volume of the adsorbent particle is constituted of granular crystals having a crystal particle diameter of 20 nm or less, or columnar crystals having a width of 10 nm or less and a length of 30 nm or less,
the adsorbent particle having at least one of the following characteristics (A) and (B):
   (A) the adsorbent particle contains a metal element other than iron in an amount of 0.1 to 20% by mass with respect to an iron element; and
   (B) the adsorbent particle contains sulfur oxoacid ions in an amount of 0.01 to 20% by mass in terms of a sulfur element with respect to an iron element, and
the adsorbent particle having a BET specific surface area(S) of 200 m²/g or more.

2. The adsorbent particle according to claim 1, wherein the metal element other than iron is at least one metal element of group 4 to group 13 other than iron.

3. The adsorbent particle according to claim 1, wherein the sulfur oxoacid ions are sulfate ions.

4. The adsorbent particle according to claim 1, wherein the adsorbent particle has an average particle diameter of 0.01 mm to 10 mm.

5. The adsorbent particle according to claim 1, wherein the adsorbent particle is an anion adsorbent.

6. The adsorbent particle according to claim 5, wherein an adsorbed amount (A) in terms of phosphorus per g of adsorbent is 35 mg or more after 24 h in a batch adsorption test performed by introducing 1 g of adsorbent into 150 mL of a potassium dihydrogen phosphate aqueous solution having a concentration of 400 mg-P/L in terms of phosphorus and having pH adjusted at 3.5 with hydrochloric acid, and stirring at room temperature.

7. An adsorbent particle having a crystal structure of β-iron oxyhydroxide, having an average crystallite diameter of 10 nm or less as measured by X-ray diffraction,
wherein 90% or more of a volume of the adsorbent particle is constituted of granular crystals having a crystal particle diameter of 20 nm or less, or columnar crystals having a width of 10 nm or less and a length of 30 nm or less, and
wherein A≥87S/(S+385) holds when a BET specific surface area is S m²/g, and an adsorbed amount in terms of phosphorus per g of adsorbent after 24 h by a batch adsorption test is A mg, the batch adsorption test being performed by introducing 1 g of adsorbent into 150 mL of a potassium dihydrogen phosphate aqueous solution having a concentration of 400 mg-P/L in terms of phosphorus and having pH adjusted at 3.5 with hydrochloric acid, and stirring at room temperature.

8. A method for producing the adsorbent particle according to claim 1, comprising
a step of adding a base to a solution while adjusting pH to be in a range of 3 to 6, to produce iron oxyhydroxide,
the base being represented by YOH, where Y represents a monovalent atom or atomic group, and
the solution comprising:
   at least one trivalent iron compound represented by $Fe_{n1}X_{n2}$, where represents one or more atoms or atomic groups other than OH, and n1 and n2 each represent an integer of 1 or more, and
   at least one compound represented by $M_{n3}X'_{n4}$, where either (α) M represents a metal element other than iron, and X' represents one or more atoms or atomic groups, or (β) M represents a positive atom or atomic group, and X' represents a sulfur oxoacid ion; and n3 and n4 each represent an integer of 1 or more, and
   optionally an electrolyte different from the trivalent iron compound represented by $Fe_{n1}X_{n2}$ and the compound represented by $M_{n3}X'_{n4}$.

9. The method according to claim 8, wherein in the step of producing iron oxyhydroxide, a concentration of a sum of electrolytes used is 10% by mass or more with respect to a total amount of raw materials.

10. The method according to claim 8, further comprising, after the step of producing iron oxyhydroxide,
a step of adding an electrolyte different from the trivalent iron compound represented by $Fe_{n1}X_{n2}$ and the compound represented by $M_{n3}X'_{n4}$, and then a step of recovering, as a water-containing cake, a precipitate comprising iron oxyhydroxide as a main component, and a step of drying the water-containing cake.

11. The method according to claim 10, further comprising a step of bringing into contact with water a dry solid comprising iron oxyhydroxide as a main component obtained in the previous step, and then drying the dry solid.

12. The method according to claim 10, wherein in the step of drying the water-containing cake, the water-containing cake is dried in a state of containing a by-product represented by $Y_{n5}X$, where X and Y each represent the same as above, and n5 is a valence of X, and electrolytes other than the by-product in the water-containing cake in a total amount of 10% by mass or more on a dry basis.

13. The method according to claim 8, wherein at least one anion selected from an anion represented by $X^-$, an anion represented by $X''^-$, and an anion included in the electrolyte different from the trivalent iron compound represented by $Fe_{n1}X_{n2}$ and the compound represented by $M_{n3}X'_{n4}$, is a chloride ion.

* * * * *